United States Patent
Zhang et al.

(10) Patent No.: US 12,206,533 B2
(45) Date of Patent: Jan. 21, 2025

(54) NON-LONG RANGE PREAMBLE DESIGN FOR LONG RANGE WIRELESS PACKET AND METHODS FOR PROCESSING THE PREAMBLE

(71) Applicant: NXP USA, Inc., Austin, TX (US)

(72) Inventors: Hongyuan Zhang, Fremont, CA (US); Hari Ram Balakrishnan, Chennai (IN); Sudhir Srinivasa, Los Gatos, CA (US)

(73) Assignee: NXP USA, Inc., Austin, TX (US)

(*) Notice: Subject to any disclaimer, the term of this patent is extended or adjusted under 35 U.S.C. 154(b) by 24 days.

(21) Appl. No.: 18/347,801

(22) Filed: Jul. 6, 2023

(65) Prior Publication Data
US 2024/0022459 A1 Jan. 18, 2024

(30) Foreign Application Priority Data
Jul. 13, 2022 (IN) .............................. 202221040219

(51) Int. Cl.
*H04L 27/20* (2006.01)
*H04L 1/00* (2006.01)
*H04L 5/00* (2006.01)

(52) U.S. Cl.
CPC ............ *H04L 27/20* (2013.01); *H04L 1/0043* (2013.01); *H04L 5/0053* (2013.01)

(58) Field of Classification Search
CPC ......... H04L 27/18; H04L 27/20; H04L 5/003; H04L 5/0053; H04L 1/0023; H04L 1/0028; H04L 1/0031; H04L 1/0043; H04L 1/003; H04L 1/1607; H04L 1/1664; H04L 1/0036; H04L 1/0038; H04L 1/0039
See application file for complete search history.

(56) References Cited

U.S. PATENT DOCUMENTS

| | | | | |
|---|---|---|---|---|
| 8,665,949 B1* | 3/2014 | Zhang | ................... | H04L 1/0625 375/240.1 |
| 8,867,675 B1* | 10/2014 | Zhang | ................. | H04L 27/2692 375/259 |
| 8,885,740 B2* | 11/2014 | Zhang | ................. | H04L 27/2602 455/45 |
| 8,891,435 B2* | 11/2014 | Zhang | ................. | H04L 27/2602 370/330 |

(Continued)

OTHER PUBLICATIONS

Vermani, Sameer, "Extended Range Support for 11ax" IEEE082.11-15-1309-01-00az, Nov. 9, 2015, 17 pages.

(Continued)

*Primary Examiner* — James M Perez (57) ABSTRACT

A method and system comprises receiving a signal over an air interface. A binary sequence is detected in the signal. A legacy signal (L-SIG) field of a physical layer protocol data circuit (PPDU) is decoded based on the detected binary sequence and based on decoding the L-SIG field, two spoofing symbols which directly follow the L-SIG field is checked in the PPDU, wherein the two spoofing symbols comprise binary phase shift keying (BPSK) symbols. Based a presence of the two spoofing symbols, a long range portion of the PPDU is processed; and based on an absence of the two spoofing symbols, the PPDU is processed as a legacy PPDU.

19 Claims, 5 Drawing Sheets

(56) References Cited

U.S. PATENT DOCUMENTS

| | | | | |
|---|---|---|---|---|
| 8,989,392 B2* | 3/2015 | Zhang | H04W 56/004 |
| | | | | 370/476 |
| 9,130,727 B2* | 9/2015 | Zhang | H04L 1/0046 |
| 9,178,745 B2* | 11/2015 | Zhang | H04L 27/2613 |
| 9,419,849 B2* | 8/2016 | Zhang | H04L 1/0046 |
| 9,461,858 B1* | 10/2016 | Zhang | H04L 27/2627 |
| 9,667,460 B2* | 5/2017 | Zhang | H04L 27/26136 |
| 9,712,358 B2* | 7/2017 | Zhang | H04L 27/2698 |
| 9,729,369 B1* | 8/2017 | Zhang | H04L 1/0041 |
| 9,736,724 B2* | 8/2017 | Zhang | H04W 28/06 |
| 9,942,008 B1* | 4/2018 | Sun | H04W 52/0248 |
| 10,153,930 B2* | 12/2018 | Zhang | H04L 27/26136 |
| 10,194,006 B2* | 1/2019 | Zhang | H04L 27/2602 |
| 10,218,822 B2* | 2/2019 | Zhang | H04L 27/2613 |
| 10,291,752 B2* | 5/2019 | Zhang | H04L 27/2602 |
| 10,389,562 B2* | 8/2019 | Zhang | H04L 27/26136 |
| 10,397,033 B2* | 8/2019 | Zhang | H04L 27/2613 |
| 10,548,082 B2* | 1/2020 | Cao | H04W 52/0225 |
| 10,616,017 B2* | 4/2020 | Liu | H04L 27/2613 |
| 10,707,928 B2* | 7/2020 | Chu | H04L 1/1861 |
| 10,727,990 B2* | 7/2020 | Cao | H04L 5/0007 |
| 10,797,821 B1* | 10/2020 | Sun | H04L 27/2603 |
| 10,873,909 B1* | 12/2020 | Chu | H04W 52/0229 |
| 10,979,543 B2* | 4/2021 | Sun | H04W 4/70 |
| 11,044,669 B2* | 6/2021 | Cao | H04W 52/0225 |
| 11,146,434 B2* | 10/2021 | Zhang | H04L 1/0057 |
| 11,165,892 B2* | 11/2021 | Zhang | H04L 27/2613 |
| 11,190,396 B1* | 11/2021 | Cao | H04L 41/0803 |
| 11,374,683 B1* | 6/2022 | Ram | H04L 27/2603 |
| 11,431,641 B2* | 8/2022 | Zheng | H04L 1/0009 |
| 11,510,143 B1* | 11/2022 | Chu | H04W 52/0229 |
| 11,638,238 B2* | 4/2023 | Chu | H04W 72/23 |
| | | | | 370/329 |
| 11,671,943 B2* | 6/2023 | Lim | H04W 72/04 |
| | | | | 370/329 |
| 11,871,348 B1* | 1/2024 | Chu | H04W 52/0229 |
| 11,882,062 B2* | 1/2024 | Cao | H04L 5/0048 |
| 11,916,624 B2* | 2/2024 | Sethi | H04W 74/0816 |
| 11,937,230 B2* | 3/2024 | Cao | H04W 72/0453 |
| 11,943,751 B2* | 3/2024 | Lim | H04L 5/0048 |
| 11,956,080 B2* | 4/2024 | Jang | H04L 5/0007 |
| 11,962,444 B2* | 4/2024 | Zhang | H04L 27/2613 |
| 12,028,149 B2* | 7/2024 | Khude | H04B 7/15507 |
| 12,034,580 B2* | 7/2024 | Lim | H04L 5/0044 |
| 12,075,398 B2* | 8/2024 | Lim | H04L 5/0053 |
| 2004/0005018 A1* | 1/2004 | Zhu | H04L 27/2662 |
| | | | | 375/340 |
| 2008/0299962 A1* | 12/2008 | Kasher | H04L 27/0008 |
| | | | | 370/465 |
| 2009/0092154 A1* | 4/2009 | Malik | H04L 12/2861 |
| | | | | 370/480 |
| 2010/0091911 A1* | 4/2010 | Sawai | H04L 27/2656 |
| | | | | 375/362 |
| 2010/0142434 A1* | 6/2010 | Rodmell | H04W 88/02 |
| | | | | 370/315 |
| 2012/0195391 A1* | 8/2012 | Zhang | H04L 5/0048 |
| | | | | 375/295 |
| 2012/0201315 A1* | 8/2012 | Zhang | H04L 1/08 |
| | | | | 375/299 |
| 2012/0201316 A1* | 8/2012 | Zhang | H03M 13/23 |
| | | | | 375/260 |
| 2012/0314869 A1* | 12/2012 | Zhang | H04W 56/004 |
| | | | | 380/287 |
| 2012/0320889 A1* | 12/2012 | Zhang | H04L 1/08 |
| | | | | 370/338 |
| 2013/0121243 A1* | 5/2013 | Vermani | H04L 1/0029 |
| | | | | 370/328 |
| 2013/0121244 A1* | 5/2013 | Vermani | H04L 1/0029 |
| | | | | 370/328 |
| 2013/0121245 A1* | 5/2013 | Vermani | H04L 1/0025 |
| | | | | 370/328 |
| 2013/0128806 A1* | 5/2013 | Vermani | H04L 69/22 |
| | | | | 370/328 |
| 2014/0029681 A1* | 1/2014 | Zhang | H04L 1/0046 |
| | | | | 375/260 |
| 2015/0117227 A1* | 4/2015 | Zhang | H04L 27/2698 |
| | | | | 370/245 |
| 2015/0117433 A1* | 4/2015 | Zhang | H04L 27/2602 |
| | | | | 370/338 |
| 2015/0131640 A1* | 5/2015 | Seok | H04W 76/11 |
| | | | | 370/338 |
| 2015/0195742 A1* | 7/2015 | Zhang | H04W 28/06 |
| | | | | 370/338 |
| 2015/0381394 A1* | 12/2015 | Zhang | H03M 13/23 |
| | | | | 375/260 |
| 2016/0056991 A1* | 2/2016 | Zhang | H04L 69/22 |
| | | | | 375/260 |
| 2016/0087827 A1* | 3/2016 | Zhang | H04W 84/12 |
| | | | | 370/338 |
| 2016/0156750 A1* | 6/2016 | Zhang | H04L 27/2613 |
| | | | | 370/338 |
| 2017/0272976 A1* | 9/2017 | Yang | H04L 27/2613 |
| 2017/0310514 A1* | 10/2017 | Zhang | H04W 84/12 |
| 2017/0310515 A1* | 10/2017 | Zhang | H04W 84/12 |
| 2018/0014329 A1* | 1/2018 | Lee | H04L 27/2603 |
| 2018/0048740 A1* | 2/2018 | Zhang | H04L 27/2613 |
| 2018/0199283 A1* | 7/2018 | Chen | H04W 52/0206 |
| 2018/0343614 A1* | 11/2018 | Cao | H04W 52/0225 |
| 2019/0019361 A1* | 1/2019 | Kayhani | G06T 7/80 |
| 2019/0268449 A1* | 8/2019 | Zhang | H04L 27/2603 |
| 2019/0268739 A1* | 8/2019 | Cariou | H04L 27/2603 |
| 2019/0372814 A1* | 12/2019 | Zhang | H04W 84/12 |
| 2020/0163016 A1* | 5/2020 | Cao | H04W 28/065 |
| 2020/0269810 A1* | 8/2020 | Godet | G07C 9/00309 |
| 2020/0287759 A1* | 9/2020 | Van Nee | H04L 27/2613 |
| 2021/0127291 A1* | 4/2021 | Chen | H04W 28/0231 |
| 2021/0227529 A1* | 7/2021 | Chu | H04W 72/23 |
| 2021/0266386 A1* | 8/2021 | Cao | H04L 27/2602 |
| 2021/0391961 A1* | 12/2021 | Cao | H04L 1/08 |
| 2021/0392661 A1* | 12/2021 | Cao | H04W 72/0453 |
| 2022/0021757 A1* | 1/2022 | Zhang | H04W 84/12 |
| 2022/0045889 A1* | 2/2022 | Yu | H04W 72/0453 |
| 2022/0060941 A1* | 2/2022 | Suh | H04W 28/065 |
| 2022/0116921 A1* | 4/2022 | Lim | H04W 72/044 |
| 2022/0116993 A1* | 4/2022 | Cariou | H04W 74/0808 |
| 2022/0231788 A1* | 7/2022 | Lim | H04L 1/08 |
| 2022/0407644 A1* | 12/2022 | Cao | H04L 5/0007 |
| 2022/0416988 A1* | 12/2022 | Cao | H04L 5/0044 |
| 2023/0051675 A1* | 2/2023 | Grandhe | H04L 5/0053 |
| 2023/0054803 A1* | 2/2023 | Lim | H04L 5/0094 |
| 2023/0239186 A1* | 7/2023 | Lim | H04L 27/2602 |
| | | | | 370/329 |
| 2023/0308326 A1* | 9/2023 | Xin | H04L 1/0041 |
| 2023/0413062 A1* | 12/2023 | Park | H04L 27/2603 |
| 2023/0422097 A1* | 12/2023 | Namba | H04W 76/15 |
| 2024/0015059 A1* | 1/2024 | Balakrishnan | H04L 27/2085 |
| 2024/0015788 A1* | 1/2024 | Silverman | H04L 1/0058 |
| 2024/0015789 A1* | 1/2024 | Hart | H04W 74/0891 |
| 2024/0022459 A1* | 1/2024 | Zhang | H04L 5/0053 |
| 2024/0031059 A1* | 1/2024 | Park | H04L 5/0092 |
| 2024/0031094 A1* | 1/2024 | Fang | H04W 74/08 |
| 2024/0163894 A1* | 5/2024 | Xiong | H04L 1/1854 |
| 2024/0224124 A1* | 7/2024 | Jang | H04B 1/00 |

OTHER PUBLICATIONS

Porat, Ron, "6GHz LPI Range Extension," IEEE 802.11-20/0965r4, Aug. 4, 2020, 10 pages.

Dogukan et al., "Diversity Enhancement for DUP Mode," IEEE 802.11-21/0368r4, Oct. 6, 2021, 16 pages.

Sahin et al., "A comparison of BPSK-Mark Options," IEEE 802.11-18/1156r1, Jul. 9, 2018, 16 pages.

Shellhammer, Steve, "IEEE P802.11 Wireless LANs, Contents of BPSK Mark Symbols," IEEE P802.11-19/1640r0, Sep. 16, 2019, 3 pages.

IEEE, "Part 11: Wireless LAN Medium Access Control (MAC) and Physical Layer (PHY) Specifications Amendment 1: Enhancements for High-Efficiency WLAN," Approved Feb. 9, 2021, 767 pages.

IEEE, "IEEE P802.11be™M/D3.0 Draft Standard for Information (56) References Cited

OTHER PUBLICATIONS technology—Telecommunications and information exchange between systems Local and metropolitan area networks—Specific requirements," Jan. 2023, 999 pages.

U.S. Appl. No. 18/347,769 "Method and System for Range Extension in Wireless Communication," filed Jul. 6, 2023.

\* cited by examiner

NON-LONG RANGE PREAMBLE DESIGN FOR LONG RANGE WIRELESS PACKET AND METHODS FOR PROCESSING THE PREAMBLE

RELATED APPLICATION

This application claims a benefit of priority to Indian Provisional Application Number 202221040219, filed Jul. 13, 2022, the contents of which is incorporated herein by reference in its entirety.

FIELD OF USE

This disclosure generally relates to wireless communication, and more particularly to a non-long range preamble design for a long range packet associated with wireless communication and methods for processing the preamble.

BACKGROUND

In wireless communications, wireless devices, e.g., Access Points (APs) and client stations (STA), wirelessly transmit and receive packets. As a number of devices increase and new services are supported by these devices, the wireless devices need to communicate the packets over greater ranges. To extend this range, Institute of Electrical and Electronics Engineers (IEEE) 802.11ax and IEEE 802.11be standards define a long range physical layer protocol data unit (PPDU). The long range PPDU has a long range format which includes a legacy preamble followed by a long range portion. Even though the standards define the long range PPDU, some wireless devices do not support receiving the long range PPDU. If such a wireless device receives the long range PPDU, the wireless device will unnecessarily consume power in an attempt to decode the legacy preamble and the long range portion before eventually discarding the long range PPDU.

BRIEF DESCRIPTION OF THE DRAWINGS

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Embodiments disclosed herein are directed to a non-legacy wireless device determining that a physical layer protocol data unit (PPDU) has a long range (LR) format at an extended range without having to decode a long range portion of the PPDU. Further, the PPDU is backwards compatible and co-exists with legacy wireless devices. To indicate that the PPDU has the LR format, the PPDU has one or more spoofing symbols and a repetition of the spoofing symbols allow the non-legacy device to determine the PPDU type at an extended range rather than having to decode the long range portion. If a non-legacy device not arranged to support the LR format receives the PPDU, this non-legacy device may determine based on the spoofing symbols that the PPDU has the LR format at the extended range and responsively stop further processing of the PPDU rather than attempting to decode the long range portion which is not supported. Further, the non-legacy device may back off any transmissions based on a duration of the PPDU indicated in the non-long range preamble portion. Advantageously, the spoofing symbols allow the non-legacy device which does not support receiving a PPDU with the LR format to save power associated with processing the entire PPDU. Well known instructions, protocols, structures, and techniques have not been shown in detail in order not to obfuscate the description.

Figure 1:
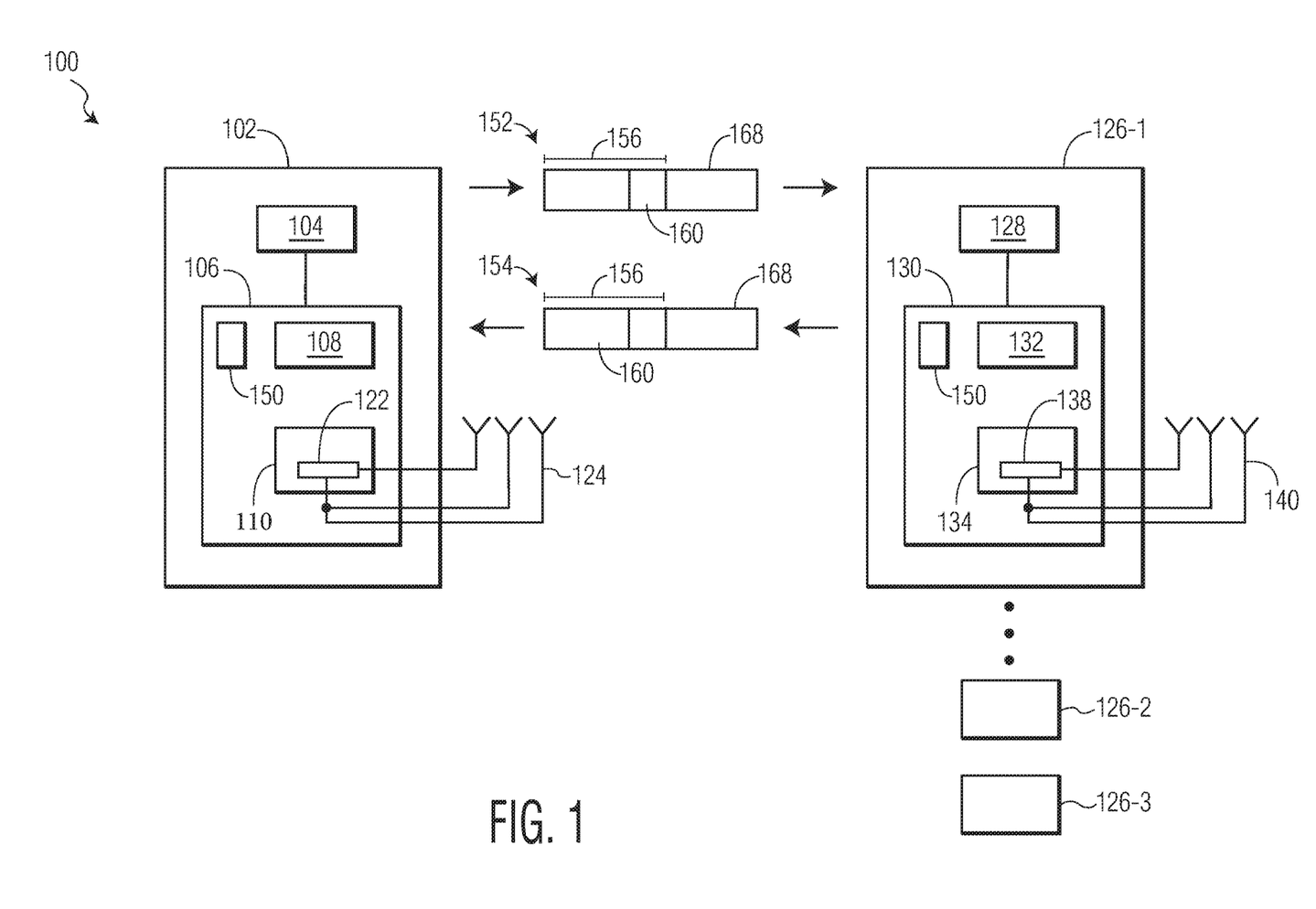
FIG. 1 is a block diagram of an example wireless local area network in accordance with an embodiment.

FIG. 1 is a block diagram of an example wireless local area network (WLAN) 100 in accordance with an embodiment. A wireless device in the form of an AP 102 includes a host processor 104 coupled to a network interface 106. The network interface 106 includes a medium access control (MAC) processing circuit 108 and a physical layer (PHY) processing circuit 110. The PHY processing circuit 110 includes a plurality of transceivers 122 (e.g., transmitters and receivers) and the transceivers 122 are coupled to a plurality of antennas 124. Although three transceivers 122 and three antennas 124 are illustrated in FIG. 1, the AP 102 includes other suitable numbers (e.g., 1, 2, 4, 5, etc.) of transceivers 122 and antennas 124 in other embodiments. In one embodiment, the MAC processing circuit 108 and the PHY processing circuit 110 are configured to operate based on a communication protocol such as Institute of Electrical and Electronics Engineers (IEEE) 802.11 WiFi standard.

The WLAN 100 also includes one or more wireless devices in the form of a plurality of client stations 126. Three client stations 126 shown as 126-1, 126-2, and 126-3 are illustrated in FIG. 1, but the WLAN 100 may include other suitable numbers (e.g., 1, 2, 3, 5, 6, etc.) of client stations 126 in various scenarios and embodiments. At least one of the client stations 126 (e.g., client station 126-1) is configured to operate at least according to the communication protocol to communicate with the AP 102. The client station 126-1 includes a host processor 128 coupled to a network interface 130 which includes a MAC processing circuit 132 and a PHY processing circuit 134. The PHY processing circuit 134 includes a plurality of transceivers 138, and the transceivers 138 are coupled to a plurality of antennas 140. Although three transceivers 138 and three antennas 140 are illustrated in FIG. 1, the client station 126-1 includes other suitable numbers (e.g., 1, 2, 4, 5, etc.) of transceivers 138 and antennas 140 in other embodiments. In one embodiment, the MAC processing circuit 132 and the PHY processing circuit 134 are configured to operate based on a communication protocol such as institute of Electrical and Electronics Engineers (IEEE) 802.11 WiFi standard.

In an example, one or more of the devices 102, 126 and components therein may be implemented with circuitry such as one or more of analog circuitry, mix signal circuitry, memory circuitry, logic circuitry, and processing circuitry that executes code stored in a memory that when executed by the processing circuitry performs the disclosed functions, among other implementations. In an example, the implementation may be a system on a chip (SoC).

In an embodiment, the PHY processing circuit 110 is configured to transmit packets which are referred to as physical-layer protocol data circuits (PPDU) 152 via the antenna(s) 124 over an air interface and the PHY processing circuit 134 of the client station 126-1 is configured to receive the PPDU 152 via the antenna(s) 140 over the air interface. Similarly, the PHY processing circuit 134 is configured to transmit PPDU 154 via the antenna(s) 140 and the PHY processing circuit 110 is configured to receive the PPDU 154 via the antenna(s) 124. In an example, the PPDU may facilitate communicating data between the AP 102 and the client device 126-1 and the PPDU 152 may be transmitted in a downlink direction while the PPDU 154 may be transmitted in an uplink direction. The PPDU 152, 154 may be transmitted in a communication channel which may be a 20 MHz channel in an example associated with IEEE 802.11.

In embodiments, the AP 102 and one or more of the client stations 126 includes a respective range extension circuit 150 and the PPDUs 152, 154 may be long range (LR) PPDUs 152, 154. The range extension circuit 150 may define a format of the transmitted LR PPDUs 152 154 to increase a range and/or signal-to-noise ratio (SNR) associated with transmission and reception of the PPDU 152, 154 and process for transmitting and receiving the PPDU. In an example, the range extension circuit 150 may be a resource of the network interface to support transmission and reception of the PPDU. The extended range PPDU improves on a reception range compared to a conventional PPDU.

A long range (LR) format of the PPDU 152, 154 includes a non-long range preamble portion 156 and a long range (LR) portion 168. Legacy standards may be adopted standards up to and including IEEE 802.11be (e.g., including IEEE 802.11 a/g/n/ac/ax/be) and non-legacy standards may be standards proposed after IEEE 802.11be such as WiFi 8 UHR (ultra high reliable) while being backward compatible with the legacy IEEE 802.11 standard. In an example, the non-legacy standard may be modified to define the PPDU 152, 154 with the LR format. The non-long range preamble portion 156 has fields backwards compatible with legacy IEEE 802.11 standards and the long range portion 168 has fields compatible with the non-legacy IEEE 802.11 standard. In examples, the PPDU 152, 154 may additionally include a spoofing symbol field 160 in the non-long range preamble portion 156 which has two or more spoofing symbols each comprising one or more bits. The spoofing symbol field 160 is an improvement to the non-legacy standard while maintaining backwards compatibility and co-existence with the legacy standard. The spoofing symbols spoof a legacy device to believing that the PPDU is a legacy PPDU and not a long range PPDU. Further, the spoofing symbols allow a receiver to determine whether the PPDU has the LR format at an extended range. The extended range refers a distance between a transmitter and the receiver such that the receiver is able determine the format of the PPDU which is greater than a distance if the receiver was to receive a legacy PPDU.

Both a legacy device and non-legacy device may receive the PPDU 152, 154. In an example, the device may receive the PPDU 152, 154 based on one or more of a carrier sense of a waveform indictive of a orthogonal frequency division multiplexed (OFDM) signal in a channel incident on the antenna and absence of a clear channel. The device may then detect and decode a binary sequence in the signal. The detection may involve the PHY processing circuit determining whether a bit that is received has a value of "1" or a value of "0". An indication of the detected bits may be provided to the MAC processing circuit which decodes the one or more bits. Decoding is a process of determining a valid binary sequence of the received PPDU 152, 154 referred to as decoded bits. In an example, the decoding may involve performing a parity check or cyclic redundancy check (CRC) which determine whether the decoding is successful or is not successful. Further, in some examples processing of bits of a PPDU includes performing a decoding of the bits. The MAC processing circuit may then determine based on the decoded bits a format of the PPDU 152, 154. If the legacy device receives the PPDU 152, 154, the MAC processing circuit may determine based on the non-long range preamble portion 156 that the PPDU has a packet format compatible with a legacy standard and forward the PPDU 152, 154 to upper layer processing which then discards the PPDU because the spoofing symbols 160 are incompatible with the legacy standard. The non-legacy device may be arranged to support processing the LR format or not support processing the LR format. If the non-legacy device arranged to support the LR format receives the PPDU 152, 154, the non-legacy device may determine based on the spoofing symbols 160 that the PPDU 152, 154 has the LR format and forward the PPDU 152, 154 to upper layer processing. Further, a repetition in the spoofing symbols 160 may allow the non-legacy device to determine the PPDU type at an extended range rather than having to decode the long range portion 168. A non-legacy device not arranged to support the LR format may be able to decode the PPDU to determine that the format is LR but not decode any data of the PPDU. If the non-legacy device not arranged to support the LR format receives the PPDU 152, 154, this non-legacy device may determine based on the spoofing symbols 160 that the PPDU 152, 154 has the LR format and responsively stop further processing of the PPDU and discard the PPDU. The spoofing symbols 160 may allow this non-legacy device to determine the PPDU type at the extended range rather than attempting to decode the long range portion 168. Further, the legacy and non-legacy device may back off any transmissions based on a duration of the PPDU indicated in the non-long range preamble portion 156. Advantageously, the spoofing symbols allow the non-legacy device which does not support receiving a PPDU with the LR format to determine that the PPDU has the LR format early in the processing of the PPDU and at an extended range and save power associated with processing the entire PPDU. Further, the PPDU is backwards compatible and coexists with legacy standards. The legacy device which receives the packet decodes the packet as having a packet format compatible with a legacy standard even though the packet format is not defined by the legacy standard. In an example, the PPDU 152 may be a trigger frame which is transmitted by the AP device 102 and which is received by the client device 126 in a downlink direction. The trigger frame may solicit a response from the client device 126 which responsively transmit the PPDU 154 which is an uplink packet from the client device 126 back to the AP device 102 in an uplink direction.

Figure 2:
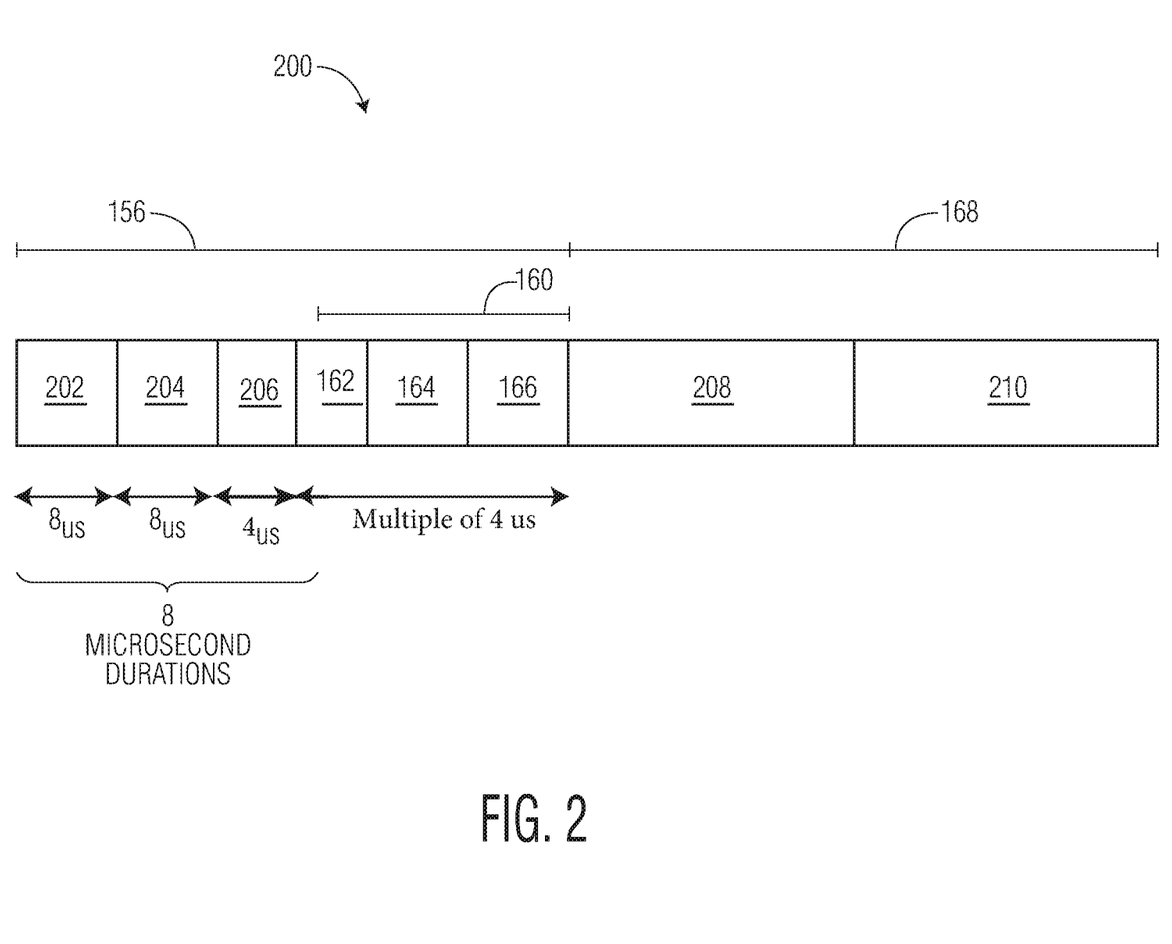
FIG. 2 is an example of fields of the long range packet format of a physical layer packet data circuit (PPDU) in accordance with an embodiment.

FIG. 2 is an example of fields of the long range packet format 200 of the PPDU 152, 154 in accordance with an embodiment. The long range packet format 200 may have the non-long range preamble portion 156 followed by the LR portion 168. The non-long range preamble portion 156 includes legacy fields having a plurality of bits that the legacy and non-legacy 802.11 devices are able to detect and/or decode while the LR portion 168 may include non-legacy fields that only the non-legacy 802.11 devices may be able to decode so that non-legacy devices are able to receive data with increased range and signal-to-noise (SNR) ratio. The non-long range preamble portion 156 may define a legacy-short training field (L-STF) 202, legacy long training field (L-LTF) 204, and a legacy signal (L-SIG) field 206. In an example, the L-STF 202 is a waveform which is 8 microseconds (us) used to detect a starting of the PPDU or portion thereof and to establish symbol timing for data detection, i.e., frame acquisition and time synchronization. The L-LTF 204 which is also an 8 us waveform is used for transmission channel estimation/training. The channel estimation may be a process of determining a frequency response of the channel over which the PPDU is transmitted. The L-SIG field 206 which is 4 us includes a plurality of bits indicative of parameters for data decoding in the LR portion 204 such as rate information, bandwidth information, cyclic redundancy check (CRC), etc. The L-SIG field 206 may also indicate a length of the PPDU. The LR portion 168 also has a field 208 and field 210. In an example, the field 208 may include training and signaling fields to allow transmission of a data field 210 with data in the LR portion 204. The transmission power of one or more of waveforms of the L-STF 202 and L-LTF 204 may be boosted to improve a range to receive the fields. In an example, the power may be boosted by 3 dB compared to a power that waveforms of the L-SIG field 206 are transmitted.

In an example, the non-long range preamble 202 may further include the spoofing field 160 which has two or more spoofing symbols each a multiple of 4 us. The spoofing symbols may each define a binary sequence. In an example, the spoofing symbol may be one or more orthogonal frequency division multiplexed (OFDM) symbols which each span a channel bandwidth such as 20 MHz. In an example, the non-long range preamble 202 has spoofing symbol 162 and spoofing symbol 164 where one or more bits of a binary sequence associated with a spoofing symbol is modulated on a respective tone or subcarrier in a channel bandwidth. In an example, the modulation of the spoofing symbol 164 may be a binary phase shift keying (BPSK) of tones (subcarrier) in a resource unit (RU) to form BPSK symbols. The RU may define a plurality of tones and pilots to facilitate transmission of the bits in a frequency domain. The legacy device is able to detect the bits in the spoofing symbol based on the BPSK modulation. For legacy devices, a reception range of the PPDU may be limited by an ability for the legacy device to decode the L-SIG field 206. To improve this range, in some examples, bits of at least the spoofing symbol 162 may be the same as the bits in the L-SIG 206 and referred to as a repeated L-SIG (RL-SIG) defined by legacy standards IEEE 802.11ax/IEEE 802.11be. The legacy devices which support IEEE 802.11ax/802.11be may receive the PPDU and decode the spoofing symbol 162 to increase a range to decode the L-SIG field 206. The repetition may result in increased decoding range and further the range may be increased by combining signals indicative of bits received in the L-SIG field 206 and bits received in the spoofing symbol 162 to increase an SNR associated with bits in these fields.

In an example, a polarity of −1 or 1 may be applied to the tones of the RU on which the bits of the spoofing symbol 162 are modulated to improve a spectral shape of the PPDU 200. A waveform of a tone may have one or more periods which has an amplitude and a phase. The polarity of −1 may change the phase of the waveform by −180 degrees while a polarity of 1 may change the phase of the waveform by +180 degrees. As another example, a polarity of −1 may be applied to the tones of the RU and any pilots in the RU to improve the spectral shape. In yet another example, bits of the spoofing symbol 162 may be interleaved before BPSK modulation based on binary convolutional coding (BCC). One or more of a polarity and interleaving that is applied may be predefined and known to a receiver of the PPDU in an example. No indication of polarity or interleaving may be included in the L-SIG field 206.

As described above, the spoofing symbol 164 may be a repetition of spoofing symbol 162. In an example, the spoofing symbol 164 is a repetition of the L-SIG field 206 and also referred to as RL-SIG to extend a transmission range of decoding the non-long range preamble portion 156 of the PPDU. The term repetition, repeated, and similar variations as used herein with respect to a symbol or field means that the BPSK symbols of two fields, two symbols, or a field and symbol are the same after any applied polarity to the BPSK symbols is removed or if interleaving is not performed. Further, a same or different polarity may be applied to the tones of spoofing symbol 164 compared to the tones spoofing symbol 162. In an example, the spoof symbol 164 may be generated by applying a polarity to the tones of spoof symbol 162 after the polarity is applied to the spoof symbol 162.

The spoofing field 160 also has a plurality of additional spoofing symbols 3 to N 166 where N is an integer greater than 2. There may be no restrictions on form or content of spoofing symbols 3-N 166, but only non-legacy devices may be able to detect and decode these spoofing symbols. In an example, a phase Ø applied to the tones of the spoofing symbols 3-N 166 may be arbitrarily selected (exp(jØ)) and not limited to a polarity of −1 or 1. In another example, one or more of the symbols 3-N 166 may be or may not be a repetition of the L-SIG field 206 or spoofing symbols 162, 164.

In another example, each of the spoofing symbols may define non-legacy spoofing bits different from the bits of the L-SIG field 206. A legacy device may not be able to decode the non-legacy spoofing bits in the spoofing symbols but non-legacy devices may be able to decode the non-legacy spoofing bits in the spoofing symbols. In an example, the non-legacy spoofing bits in a spoofing symbol may be 24 bits defined as follows in Table 1:

TABLE 1

| Definition | # bits | Description |
| --- | --- | --- |
| Duration in multiple of 4 us | 11 bits | To indicate a duration of the PPDU |
| Channel reservation | 2 bits | To provide some protection to this LR packet. The transmission channel is reserved for the PPDU duration indicated in the LSIG field × (Channel reservation in decimal where each 2 bit pattern indicates a predefined multiple of the PPDU duration). The PPDU duration indicated in the L-SIG field can also be replaced by a predefined duration. The reserved duration is the duration in the L-SIG field and the additional duration |

TABLE 1-continued

| Definition | # bits | Description |
|---|---|---|
| | | estimation from this field. The transmission channel reservation indicates that the transmitter will be reserving the transmission channel to transmits PPDU for the period of the transmission channel reservation. The transmission channel reservation may be used to transmit multiple packets. |
| CRC | 4 bits | Cyclic redundancy code (CRC) same as in L-SIG |
| Tail bits | 6 bits | Tail bits which is are padding bits |
| Reserved | 1 bits | Bits reserved for future use |

In an example, the non-legacy spoofing bits in the spoofing symbols 160 may be encoded with BCC and modulated on tones with BPSK to form BPSK symbols. The BCC coding may be rate ½ BCC with interleaving. A polarity, examples of which are described above, may be applied to waveforms of the modulated tones. The spoofing symbols may be repetitions of each other in an example and, in an example, the signals indicative of bits of the repeated spoofing symbols may be combined by a non-legacy device to improve an SNR of the bits and subsequent decoding of the bits.

Figure 3:
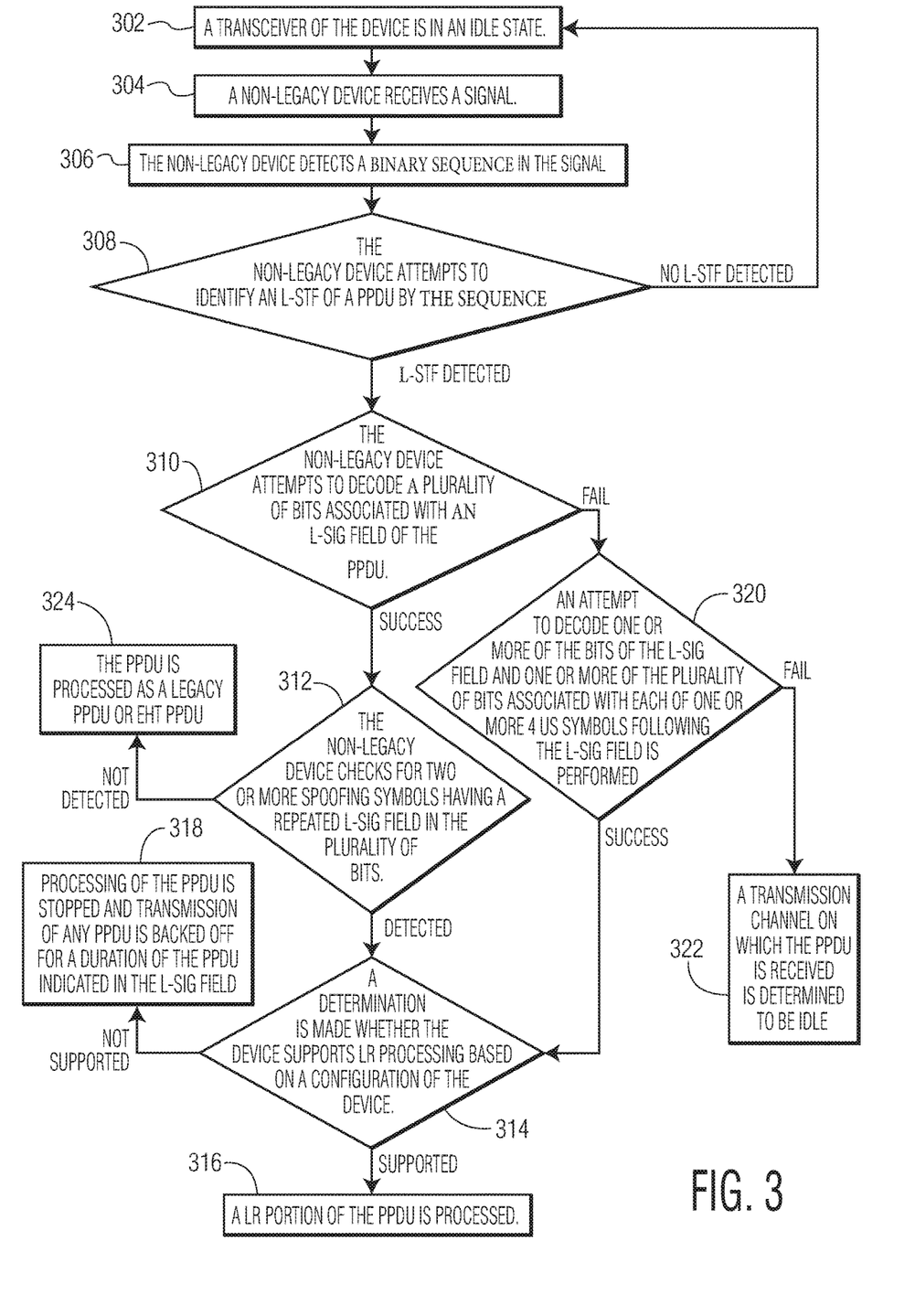
FIG. 3 is a flow chart of functions associated with a non-legacy device receiving a PPDU with repetition of a legacy signal (L-SIG) field in one or more spoofing symbols in accordance with an embodiment

FIG. 3 is a flow chart 300 of functions associated with a non-legacy device receiving a PPDU with repetition of the L-SIG field in one or more spoofing symbols in accordance with an embodiment. The functions may be performed by one or more of the PHY processing circuit, MAC processing circuit, host processor, and range extension circuit 150 among other circuits in the non-legacy device.

A transceiver of the device may be in an idle state at 302. In the idle state, there may be no signal for the device to receive. At 304, a non-legacy device receives a signal. In an example, the non-legacy device may determine that the signal is received based on a carrier sense of a waveform of an orthogonal frequency division multiplexed (OFDM) signal in a channel and absence of a clear channel. The signal may be received in a 20 MHz channel of the non-legacy device receive bandwidth in an example.

A signal in the form of the long range PPDU may have the non-long range preamble portion 156 and the LR portion 168. At 306, the non-legacy device may detect a waveform in the signal. In an example, the PHY processing circuit may detect the waveform. Based on the waveform, the non-legacy device may attempt to identify an L-STF of a PPDU at 308. If the L-STF is identified, then processing moves to 310 and otherwise processing returns to 302 where, in some examples, detection criteria for the LR portion 168 may be executed. At 310, the non-legacy device may attempt to decode a plurality of bits associated with an L-SIG field of the PPDU from the binary sequence. The decoding may be based on a parity check of the one or more bits and if a parity is a first value, then the parity check fails resulting in the decoding failing while if the parity has a second value then the parity check passes resulting in the decoding being successful. The spoofing symbol 162 in the non-long range preamble 156 may be a repetition of the bits in the L-SIG field and one or more other symbols 164 and 166 may also be a repetition of the L-SIG field in an example to extend a range of detection the PPDU type. The non-legacy device may check for two or more spoofing symbols having a repeated L-SIG field in the plurality of bits at 312 where the two or more spoofing symbols comprise binary phase shift keying (BPSK) symbols and indicate the PPDU has a long range format and where at least two of the spoofing symbols are repeated. The check may comprise decoding one or more of the plurality of bits associated with each of two or more 4 us symbols following the L-SIG field in an example. In some examples, a polarity of tones representing the one or more bits and which is known to the receiver may be removed prior to the decoding. The decoding may be based on a parity check of the one or more bits of a symbol and if a parity is a first value, then the parity check fails resulting in a spoofing symbol not being decoded and a spoofing symbol not being detected while if the parity has a second value then the parity check passes resulting in a spoofing symbol being decoded and a spoofing symbol being detected. In some examples, the range extension circuit 150 may combine signals of respective bits of two or more symbols 160 or combine the signals of respective bits of the two or more symbols 160 with the signals of bits of the L-SIG field to perform the decoding. If two or more spoofing symbols are detected, then the PPDU 200 has an LR format. A determination is made whether the device supports processing the LR format (e.g., decoding the LR portion) at 314 based on a configuration of the device. In an example, the device may store a capability indication that indicates whether the device supports processing the LR format. If the processing of the LR format is supported, the LR portion 168 is processed at 316. For example, the LR portion 168 may be decoded. Further, transmission of any PPDU is backed off for a duration of the PPDU indicated in the L-SIG field. If the non-legacy device does not support processing the LR format (e.g., decoding the LR portion) at 314, then processing of the PPDU is stopped and transmission of any PPDU is delayed for a duration of the PPDU indicated in the L-SIG field at 318. In an example, the PPDU is discarded. The two or more spoofing symbols indicate to the non-legacy device that the PPDU has a LR format so that the non-legacy device does not need to consume power to further process the PPDU and the LR format is detected with an extended range. If two or more spoofing symbols are not detected at 312, then the PPDU is processed as a legacy PPDU or extremely high throughput (EHT) PPDU at 324.

If the L-SIG parity check fails at 310, an attempt to decode the plurality of bits associated with each of one or more 4 us symbols following the L-SIG field of the PPDU is performed at 320. In some examples, the decoding may be based on combining signals of respective bits of the L-SIG and each of one or more 4 us symbols following the L-SIG field to increase an SNR of signals associated with the decoding and extend a range of decoding early in reception of the PPDU rather than having to decode the LR portion 168 to determine the PPDU has the LR format. In an example, one of the symbols may be an RL-SIG field. If the decoding of two or more symbols is successful (e.g., a parity check passes), the L-SIG is decoded and processing returns to 314. Further, the decoding of the spoofing symbols 160 allows for a non-legacy device which does not support the LR format to determine that the PPDU has the LR format which is not supported and stop processing the PPDU rather than having to attempt to decode the LR portion 168 and consume power. In an example, the spoofing symbols which is an RL-SIG may be used to improve the L-LTF transmission channel estimation which is then used to decode of the LR portion 168 of the PPDU 200 and decoding of the L-SIG field. If the decoding fails at 320, a transmission channel on which the PPDU is received is determined to be idle at 322.

Figure 4:
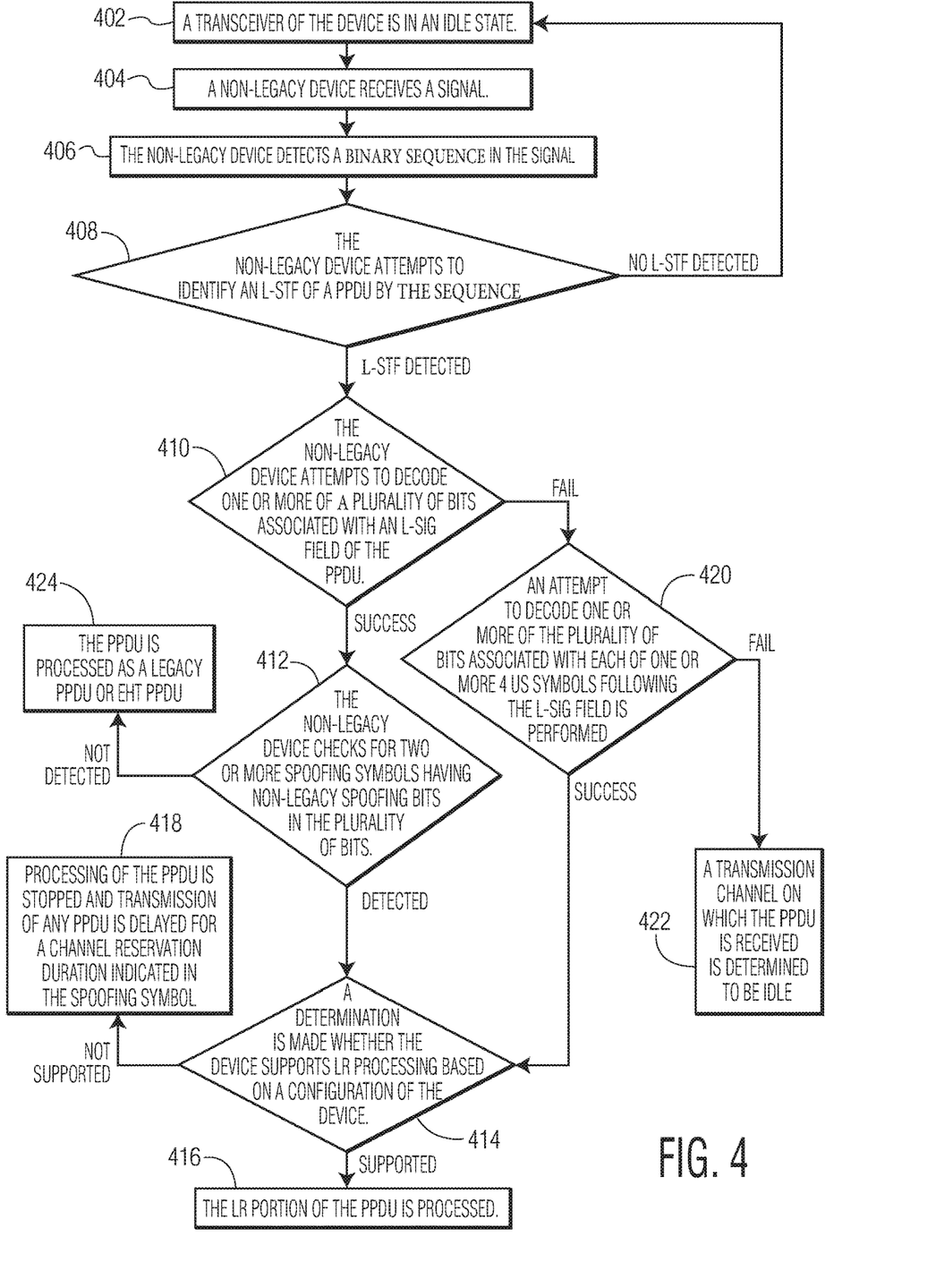
FIG. 4 is a flow chart of functions associated with a non-legacy device receiving a PPDU with the non-legacy spoofing bits in one or more spoofing symbols in accordance with an embodiment.

FIG. 4 is a flow chart 400 of functions associated with a non-legacy device receiving a PPDU with the non-legacy spoofing bits in one or more spoofing symbols in accordance with an embodiment. The functions may be performed by one or more of the PHY processing circuit, MAC processing circuit, host processor, and range extension circuit 150 among other circuits in the non-legacy device.

A transceiver of the device may be in an idle state at 402. In the idle state, there may be no signal for the device to receive. At 404, a non-legacy device may receive a signal. In an example, the non-legacy device may determine that the signal is received based on a carrier sense of a waveform of an orthogonal frequency division multiplexed (OFDM) signal in a channel and absence of a clear channel. The signal may be received in a 20 MHz channel of the device receive bandwidth in an example.

A signal in the form of the PPDU may have the non-long range portion 156 and the LR portion 168. At 406, the non-legacy device may detect a binary sequence in the signal. In an example, the PHY processing circuit may detect the binary sequence. Based on the detected sequence, the non-legacy device may attempt to identify an L-STF of a PPDU at 408. If the L-STF is identified, then processing moves to 410 and otherwise processing returns to 402 where, in some examples, detection criteria for the LR portion 168 may be executed. At 410, the non-legacy device may attempt to decode a plurality of bits associated with the L-SIG field of the PPDU from the binary sequence. The decoding may be based on a parity check of the one or more bits and if a parity is a first value, then the parity check fails resulting in the decoding failing while if the parity has a second value then the parity check passes resulting in the decoding being successful. The spoofing symbol 162 in the non-long range preamble 156 may have non-legacy spoofing bits as described above in Table 1 and one or more other symbols 164 and 166 may also be a repetition of the spoofing symbol 162. The non-legacy device may check for two or more spoofing symbols having non-legacy spoofing bits in the plurality of bits at 412, where the two or more spoofing symbols comprise binary phase shift keying (BPSK) symbols and indicate the PPDU has a long range format, and where at least two of the spoofing symbols are repeated. The check may comprise decoding one or more of the plurality of bits associated with each of two or more 4 us symbols following the L-SIG field in an example. In some examples, a polarity applied to tones representing the one or more bits and which is known to the receiver may be removed prior to the decoding. The decoding may be based on a CRC of the one or more bits of a symbol and if a CRC is a first value, then the CRC fails resulting in a spoofing symbol not being decoded and a spoofing symbol not being detected while if the CRC has a second value then the CRC passes resulting in a spoofing symbol being decoded and a spoofing symbol being detected. In some examples, the range extension circuit 150 may combine signals of respective bits of two or more symbols 160 to perform the decoding. If two or more spoofing symbols are detected, then the PPDU 200 has an LR format. A determination is made whether the device supports LR processing (e.g., decoding the LR portion) at 414 based on a configuration of the device. In an example, the device may store a capability indication that indicates whether the device supports processing the LR format. If the processing of the LR format is supported (e.g., decoding the LR portion), the LR portion 168 in the plurality of bits is processed at 416. For example, the LR portion 168 may be decoded. Further, a transmission of any PPDU is backed off for a channel reservation duration indicated in the spoofing symbol. If the non-legacy device does not support processing the LR format (e.g., decoding the LR portion) at 414, then processing of the PPDU is stopped and transmission of any PPDU is backed off for a channel reservation duration indicated in the spoofing symbol at 418. In an example, the PPDU is discarded. The two or more spoofing symbols indicate to the non-legacy device that the PPDU has a LR format so that the non-legacy device does not need to consume power to further process the PPDU and the LR format is detected with an extended range. If two or more spoofing symbols is not detected at 412, then the PPDU is processed as a legacy PPDU or EHT PPDU at 424.

If the L-SIG parity check fails at 410, an attempt to decode one or more of the plurality of bits associated with each of one or more 4 us symbols following the L-SIG field of the PPDU is performed at 420. In some examples, the decoding may be based on combining signals of respective bits of each of one or more 4 us symbols following the L-SIG field to increase an SNR of the signals associated with the decoding and extend a range of decoding early in reception of the PPDU rather than having to decode the LR portion 168 to determine the PPDU has the LR format. If the decoding of two or more symbols is successful (e.g., CRC passes), the two or more spoofing symbols is detected and processing continues to 414. Further, the decoding of the spoofing symbols 160 allows for a non-legacy device which does not support the LR format to determine that the PPDU has the LR format and stop processing the PPDU rather than having to attempt to decode the LR portion 168 which is not supported and consume more power. In an example, the spoofing symbols may be used to improve the L-LTF transmission channel estimation which is then used to decode of the LR portion 168 of the PPDU 200. If the decoding fails at 420, a transmission channel on which the PPDU is received is determined to be idle at 422.

In an example, the repeated L-SIG in the spoofing symbol or repeated new signal field in the spoofing symbol may be used to perform one or more of a symbol timing detection, carrier frequency offset estimation (CFO), or sample frequency offset (SFO) associated with the L-STF 202.

Figure 5:
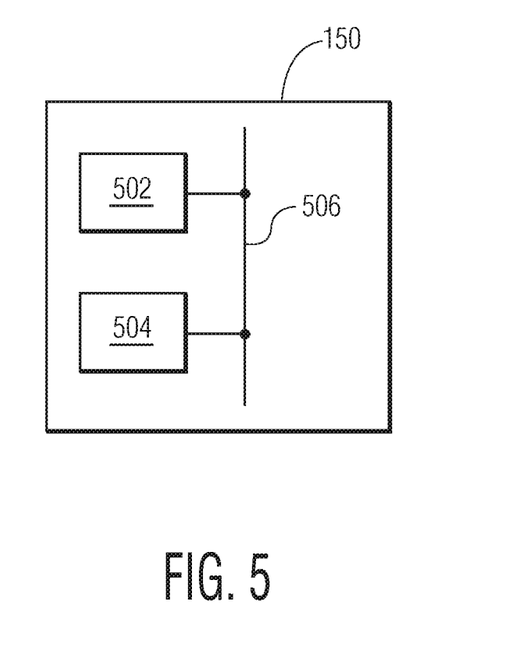
FIG. 5 is an example arrangement of a range extension circuit in accordance with an embodiment.

FIG. 5 is an example arrangement of the range extension circuit 150 in accordance with an embodiment. The range extension circuit 150 may be located in the non-legacy device and be a resource of a MAC processing circuit of the non-legacy device in an example. The range extension circuit 150 may include a processor 502 (possibly including logic circuitry, hardware, multiple processors, multiple cores, multiple nodes, and/or implementing multi-threading, etc.) and memory 504 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. In some examples, the memory 504 may store computer code, program instructions, computer instructions, program code associated with processing a PPDU which has an long range format 200, including performing error checking, combining respective bits of repeated spoofing symbols, and performing decoding as examples. Interconnect 506 such as a bus (e.g., Advanced eXtensibie interface) may couple the processor 502 and the memory 504 to facilitate performing the functions of the range extension circuit 150.

In an embodiment, a method performed in a non-legacy wireless device is disclosed. The method comprises: receiving a signal over an air interface; detecting a binary sequence comprising one or more bits in the signal; decoding a legacy signal (L-SIG) field of a physical layer protocol data circuit (PPDU) based on the detected binary sequence; based on decoding the L-SIG field, checking for two consecutive spoofing symbols in the PPDU which directly follow the L-SIG field, wherein the two spoofing symbols comprise binary phase shift keying (BPSK) symbols and indicate the PPDU has a long range format, and wherein the two spoofing symbols are repeated; based a presence of the two spoofing symbols indicated by the checking and the non-legacy device supporting processing the long range format of the PPDU, processing a long range portion of the PPDU which follows the spoofing symbols; and based on an absence of the two spoofing symbols indicated by the checking, processing the PPDU as a legacy PPDU, wherein the spoofing symbols are backwards compatible with legacy standards and are arranged to facilitate detection of the long range format by a receiver at an extended range. In an example, the two spoofing symbols are repetitions of the L-SIG field. In an example, the method further comprises delaying transmission of another PPDU for a duration of the PPDU indicated in the L-SIG field. In an example, the two spoofing symbols each comprise bits of one or more fields, the one or more fields include an indication of a duration of the PPDU, an indication of a channel reservation duration which is a multiple of a duration in the L-SIG field, a cyclic redundancy check, tail bits, and reserved bit. In an example, the method further comprises delaying transmission of another PPDU for the channel reservation duration. In an example, the method further comprises failing to decode the L-SIG field; combining signals of respective bits of the two spoofing symbols directly following the L-SIG field to improve a signal-to-noise of the signals of the bits; decoding detected bits associated with the combined signals to detect the two spoofing symbols; based on detecting the two spoofing symbols, processing the long range portion of the PPDU if the non-legacy device supports decoding the long range format of the PPDU; and based on detecting the two spoofing symbols, stop processing the PPDU if the non-legacy device does not support processing the long range format of the PPDU. In an example, the two spoofing symbols facilitate a channel estimation of a channel over which the PPDU is transmitted. In an example, the method further comprises failing to decode the L-SIG field; and determining that a channel over which the PPDU is transmitted is idle based on failing to decode the L-SIG field and an absence of the two spoofing symbols. In an example, the method further comprises based the presence of the two spoofing symbols indicated by the checking and the non-legacy device not supporting processing the long range format of the PPDU, stop processing the PPDU.

In another embodiment, a system on a chip (SoC) of a non-legacy device is disclosed. The SoC comprises: a physical layer processing circuit; a medium access control (MAC) processing circuit; and a range extension circuit; wherein the physical layer processing circuit is arranged to receive a signal over an air interface; and detect a binary sequence comprising one or more bits; wherein the MAC processing circuit is arranged to decode a legacy signal (L-SIG) field of a physical layer protocol data circuit (PPDU) based on the detected binary sequence; and wherein the range extension circuit is arranged to check for two consecutive spoofing symbols in the PPDU which directly follow the L-SIG field based on decoding the L-SIG field, wherein the two spoofing symbols comprise binary phase shift keying (BPSK) symbols and indicate the PPDU has a long range format, and wherein the two spoofing symbols are repeated; based a presence of the two spoofing symbols indicated by the checking and the SoC supporting processing the long range format of the PPDU, process a long range portion of the PPDU which follows the spoofing symbols; and based on an absence of the two spoofing symbols indicated by the checking, process the PPDU as a legacy PPDU; wherein the spoofing symbols are backwards compatible with legacy standards and are arranged to facilitate detection of the long range format by a receiver at an extended range. In an example, the two spoofing symbols are repetitions of the L-SIG field. In an example, the MAC processing circuit is further arranged to delay transmission of another PPDU for a duration of the PPDU indicated in the L-SIG field. In an example, the two spoofing symbols each comprise bits of one or more fields, the one or more fields include an indication of a duration of the PPDU, an indication of a channel reservation duration which is a multiple of a channel duration in the L-SIG field, a cyclic redundancy check, tail bits, and reserved bit. In an example, the range extension circuit is further arranged to delay transmission of another PPDU for the channel reservation duration. In an example, the range extension circuit is further arranged to fail to decode the L-SIG field; combine signals of respective bits of the two spoofing symbols directly following the L-SIG field to improve a signal-to-noise of the signals of the bits; decode detected bits associated with the combined signals to detect the two spoofing symbols; based on detecting the two spoofing symbols, process the long range portion of the PPDU if the non-legacy device supports decoding the long range format of the PPDU; and based on detecting the two spoofing symbols, stop processing the PPDU if the non-legacy device does not support processing the long range format of the PPDU. In an example, the two spoofing symbols facilitate a channel estimation of a channel over which the PPDU is transmitted. In an example, the range extension circuit is further arranged to stop processing the PPDU based the presence of the two spoofing symbols indicated by the checking and the non-legacy device not supporting processing the long range format of the PPDU. In an example, bits of the spoofing symbol are interleaved prior to being modulated to form the BPSK symbols of the spoofing symbols and wherein the range extension circuit arranged to check for two spoofing symbols in the PPDU comprises the range extension circuit arranged to deinterleave the bits. In an example, a polarity pattern is applied to tones of a spoofing symbol, the tones modulated with BSPK, and wherein the range extension circuit arranged to check for two spoofing symbols in the PPDU comprises the range extension circuit prearranged to remove the polarity applied to the tones. In an example, the polarity pattern is applied to tones of a first spoofing symbol of the two spoofing symbols to form the first spoofing symbol and the polarity pattern is applied to the tones of the first spoofing symbol to form a second spoofing symbol of the two spoofing symbols.

In yet another embodiment, a long range physical layer protocol data circuit (PPDU) is disclosed. The long range PPDU comprises: a legacy signal (L-SIG) field; two consecutive spoofing symbols in the PPDU which directly follow the L-SIG field, wherein the two spoofing symbols comprise binary phase shift keying (BPSK) symbols and indicate the PPDU has a long range format, and wherein the two spoofing symbols are repeated; and a long range portion of the PPDU which follows the spoofing symbols, wherein the spoofing symbols are backwards compatible with legacy standards and are arranged to facilitate detection of the long range format by a receiver at an extended range.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method performed in a non-legacy wireless device, the method comprising:
   receiving a signal over an air interface;
   detecting a binary sequence comprising one or more bits in the signal;
   decoding a legacy signal (L-SIG) field of a physical layer protocol data circuit (PPDU) based on the detected binary sequence;
   based on decoding the L-SIG field, checking for two consecutive spoofing symbols in the PPDU which directly follow the L-SIG field, wherein the two spoofing symbols comprise binary phase shift keying (BPSK) symbols and indicate the PPDU has a long range format, and wherein the two spoofing symbols are repeated;
   based a presence of the two spoofing symbols indicated by the checking and the non-legacy device supporting processing the long range format of the PPDU, processing a long range portion of the PPDU which follows the spoofing symbols; and
   based on an absence of the two spoofing symbols indicated by the checking, processing the PPDU as a legacy PPDU,
   wherein the spoofing symbols are backwards compatible with legacy standards and are arranged to facilitate detection of the long range format by a receiver at an extended range.

2. The method of claim 1, wherein the two spoofing symbols are repetitions of the L-SIG field.

3. The method of claim 2, further comprising delaying transmission of another PPDU for a duration of the PPDU indicated in the L-SIG field.

4. The method of claim 1, wherein the two spoofing symbols each comprise bits of one or more fields, the one or more fields include an indication of a duration of the PPDU, an indication of a channel reservation duration which is a multiple of a duration in the L-SIG field, a cyclic redundancy check, tail bits, and reserved bit.

5. The method of claim 4, further comprising delaying transmission of another PPDU for the channel reservation duration.

6. The method of claim 1, further comprising failing to decode the L-SIG field; combining signals of respective bits of the two spoofing symbols directly following the L-SIG field to improve a signal-to-noise of the signals of the bits; decoding detected bits associated with the combined signals to detect the two spoofing symbols; based on detecting the two spoofing symbols, processing the long range portion of the PPDU if the non-legacy device supports decoding the long range format of the PPDU; and based on detecting the two spoofing symbols, stop processing the PPDU if the non-legacy device does not support processing the long range format of the PPDU.

7. The method of claim 1, wherein the two spoofing symbols facilitate a channel estimation of a channel over which the PPDU is transmitted.

8. The method of claim 1, further comprising failing to decode the L-SIG field; and determining that a channel over which the PPDU is transmitted is idle based on failing to decode the L-SIG field and an absence of the two spoofing symbols.

9. The method of claim 1, further comprising based the presence of the two spoofing symbols indicated by the checking and the non-legacy device not supporting processing the long range format of the PPDU, stop processing the PPDU.

10. A system on a chip (SoC) of a non-legacy device, the SoC comprising:
   a physical layer processing circuit;
   a medium access control (MAC) processing circuit; and
   a range extension circuit;
   wherein the physical layer processing circuit is arranged to receive a signal over an air interface; and detect a binary sequence comprising one or more bits;
   wherein the MAC processing circuit is arranged to decode a legacy signal (L-SIG) field of a physical layer protocol data circuit (PPDU) based on the detected binary sequence; and
   wherein the range extension circuit is arranged to check for two consecutive spoofing symbols in the PPDU which directly follow the L-SIG field based on decoding the L-SIG field,
   wherein the two spoofing symbols comprise binary phase shift keying (BPSK) symbols and indicate the PPDU has a long range format, and wherein the two spoofing symbols are repeated; based a presence of the two spoofing symbols indicated by the checking and the SoC supporting processing the long range format of the PPDU, process a long range portion of the PPDU which follows the spoofing symbols; and based on an absence of the two spoofing symbols indicated by the checking, process the PPDU as a legacy PPDU;

wherein the spoofing symbols are backwards compatible with legacy standards and are arranged to facilitate detection of the long range format by a receiver at an extended range.

11. The SoC of claim 10, wherein the two spoofing symbols are repetitions of the L-SIG field.

12. The SoC of claim 10, wherein the MAC processing circuit is further arranged to delay transmission of another PPDU for a duration of the PPDU indicated in the L-SIG field.

13. The SoC of claim 10, wherein the two spoofing symbols each comprise bits of one or more fields, the one or more fields include an indication of a duration of the PPDU, an indication of a channel reservation duration which is a multiple of a channel duration in the L-SIG field, a cyclic redundancy check, tail bits, and reserved bit.

14. The SoC of claim 13, wherein the range extension circuit is further arranged to delay transmission of another PPDU for the channel reservation duration.

15. The SoC of claim 10, wherein the range extension circuit is further arranged to fail to decode the L-SIG field; combine signals of respective bits of the two spoofing symbols directly following the L-SIG field to improve a signal-to-noise of the signals of the bits; decode detected bits associated with the combined signals to detect the two spoofing symbols; based on detecting the two spoofing symbols, processing the long range portion of the PPDU if the non-legacy device supports decoding the long range format of the PPDU; and based on detecting the two spoofing symbols, stop processing the PPDU if the non-legacy device does not support processing the long range format of the PPDU.

16. The SoC of claim 10, wherein the range extension circuit is further arranged to stop processing the PPDU based the presence of the two spoofing symbols indicated by the checking and the non-legacy device not supporting processing the long range format of the PPDU.

17. The SoC of claim 10, wherein bits of the spoofing symbol are interleaved prior to being modulated to form the BPSK symbols of the spoofing symbols and wherein the range extension circuit arranged to check for two spoofing symbols in the PPDU comprises the range extension circuit arranged to deinterleave the bits.

18. The SoC of claim 10, wherein a polarity pattern is applied to tones of a spoofing symbol, the tones modulated with BSPK, and wherein the range extension circuit arranged to check for two spoofing symbols in the PPDU comprises the range extension circuit prearranged to remove the polarity applied to the tones.

19. The SoC of claim 18, wherein the polarity pattern is applied to tones of a first spoofing symbol of the two spoofing symbols to form the first spoofing symbol and the polarity pattern is applied to the tones of the first spoofing symbol to form a second spoofing symbol of the two spoofing symbols.

* * * * *